United States Patent [19]

Bossemeyer, Jr.

[11] Patent Number: 4,937,870

[45] Date of Patent: Jun. 26, 1990

[54] SPEECH RECOGNITION ARRANGEMENT

[75] Inventor: Robert W. Bossemeyer, Jr., St. Charles, Ill.

[73] Assignee: American Telephone and Telegraph Company, New York, N.Y.

[21] Appl. No.: 269,527

[22] Filed: Nov. 14, 1988

[51] Int. Cl.$^5$ .......................... G10L 5/00; G10L 7/08; G10L 9/06

[52] U.S. Cl. ........................................ 381/43; 381/41; 381/45

[58] Field of Search .................. 364/513.5; 381/41-43

[56] References Cited

U.S. PATENT DOCUMENTS

| | | | |
|---|---|---|---|
| 4,092,493 | 5/1978 | Rabiner et al. | 381/43 |
| 4,454,586 | 6/1984 | Pirz et al. | 381/41 |
| 4,488,243 | 12/1984 | Brown et al. | 364/513.5 |
| 4,519,094 | 5/1985 | Brown et al. | 381/43 |
| 4,712,242 | 12/1987 | Rajasekaran et al. | 381/42 |
| 4,833,713 | 5/1989 | Muroi et al. | 381/41 |
| 4,833,714 | 5/1989 | Shimotani et al. | 381/43 |

OTHER PUBLICATIONS

Atal et al., "A Pattern Recognition Approach to Voiced-Unvoiced-Silence Classification with Applications to Speech Recognition", IEEE Trans. on ASSP, vol. ASSP-24, No. 3, Jun. 1976, pp. 201–211.

D. P. Prezas et al., "Fast and Accurate Pitch Detection Using Pattern Recognition and Adaptive Time-Domain Analysis", ICASSP 86, Tokyo, 1986 IEEE, pp. 109–112.

L. R. Rabiner et al., "Isolated and Connected Word Recognition—Theory and Selected Applications", IEEE Transactions on *Communications*, vol. COM-29, No. 5, May 1981, pp. 621–659.

J. D. Markel et al., *Linear Prediction of Speech*, pp. 129–163 and pp. 227–262 (Chapters 6 and 10), 1976.

JSRU Report No. 1003, "An Experimental Automatic Word-Recognition System: Interim Report", J. S. Bridle and M. D. Brown, Aug., 1980, pp. 1–35.

IEEE Transactions on Acoustics, Speech, and Signal Processing, vol. ASSP-25, No. 5, Oct. 1977, "Detecting and Locating Key Words in Continuous Speech Using Linear Predictive Coding", Richard W. Christiansen, pp. 361–367.

CH1559-4/80/0000-0209$00.75 1980 IEEE, "The Enhancement of Wordspotting Techniques", R. E. Wohlford, A. R. Smith, and M. R. Sambur, pp. 209–212.

0347-3578/82/0000-1095 $00.75 1982 IEEE, "Low Cost Word Recognition Using Programmable VLSI", Thomas Schalk and Michael McMahan, pp. 1095–1101.

The Bell System Technical Journal, vol. 60, No. 7, Sep. 1981, "A Comparative Study of Several Dynamic Time-Warping Algorithms for Connected-Word Recognition", C. S. Myers and L. R. Rabiner, pp. 1389–1409.

*Primary Examiner*—Gary V. Harkcom
*Assistant Examiner*—David D. Knepper
*Attorney, Agent, or Firm*—Ross T. Watland

[57] ABSTRACT

A speech recognition arrangement where nonspectral features of the input signal, e.g., energy and voicing parameters, are used to effectively remove non-speech events from consideration but only after a time warping procedure based solely on the input and reference pattern spectral parameters has been completed. The time warping procedure is not unduly complex because there is no need to weight spectral and nonspectral parameters in matching input and reference patterns. For each reference pattern, the time warping procedure defines a scan region of the input signal to be used in evaluating the nonspectral input signal characteristics. Energy and voicing parameters are useful in distinguishing non-speech events since speech patterns typically have few very low-energy frames (other than frames that are part of a gap within a vocabulary item) and more than a minimum number of voiced frames, e.g., frames corresponding to vowel sounds.

11 Claims, 8 Drawing Sheets

SPEECH RECOGNIZER 10

SIGNAL PROCESSING

PATTERN MATCHING

SCAN REGION VERIFICATION

SCAN REGION VERIFICATION

VOCABULARY ITEM DETECTION

SPEECH RECOGNITION ARRANGEMENT

TECHNICAL FIELD

This invention relates to speech processing.

BACKGROUND AND PROBLEM

Network trials of speech recognition indicate that automated services such as call routing and automatic call type recognition (ACTR) can be successfully offered on the network using small vocabulary, speaker independent recognition systems. The recognition method employed in these systems relies on isolation of the target vocabulary item in the incoming signal. If the precise beginning and end of the vocabulary item is known, correct recognition is possible in more than 99 percent of the responses. However, precise location of the item can be assured only in a highly artificial way. A speech specialist examines a spectrogram of the recorded response, marks the beginning and end of the item and verifies the position of the marks by listening to the speech between them. Isolated word recognition systems rely on an endpointing process to place these marks. This process is accomplished by examining the energy profile of the signal and identifying possible beginning and ending points based on a set of rules. Performance of the isolated word recognition method using automatically generated endpoints is still very good (better than 95 percent) when the customer response contains only the desired vocabulary item. However, actual customers using recognition systems often respond with unsolicited input spoken in conjunction with the vocabulary item and under these conditions the isolated word method performs very poorly. In a trail of ACTR service, more than 20 percent of customers responded in such a manner.

Ideally, network services that use speech recognition technology would not place many constraints on the customer. Customers are not likely to be motivated to change their behavior to meet requirements of isolated word recognizers. Customers new to a service or those that use it infrequently should not be expected to respond to a recorded announcement with a carefully articulated utterance of only the target vocabulary item.

One of the important techniques in speech recognition is a procedure referred to as time warping. In order to compare an input pattern, e.g., a spoken word with a reference, each word is divided into a sequence of time frames. In each time frame, parameters representative of acoustic features of the speech pattern are obtained. For each frame of the input word, a frame of the reference word is selected. Measures representative of the similarity or correspondence between each selected pair of frames are obtained responsive to the acoustic feature signals. The similarity measures for the sequence of input and reference word frame pairs are used to determine the global or overall similarity between the input word and the reference word template.

Since there are many different ways of pronouncing the same word, the displacement in time of the acoustic features comprising the word is variable. Different utterances of the same word, even by the same individual, may be widely out of time alignment. The selection of frame pairs is therefore not necessarily linear. Matching, for example, the fourth, fifth and sixth frames of the input utterance with the fourth, fifth and sixth frames respectively of the reference word may distort the similarity measure and produce unacceptable errors.

Dynamic time warping arrangements have been developed which align the frames of a test and reference pattern in an efficient or optimal manner. The alignment is optimal in that the global similarity measure assumes an extremum. It may be, for example, that the fifth frame of the test word should be paired with the sixth frame of the reference word to obtain the best similarity measure.

In the speech recognition arrangement disclosed in the U.S. Pat. No. 4,519,094 issued to M. K. Brown et al. on May 21, 1985, a speech pattern is recognized as one of a plurality of reference patterns for which acoustic feature signal templates are stored. Each template includes a time frame (e.g., 10 millisecond) sequence of spectral parameters e.g., LPC and nonspectral e.g., acoustic energy (E) normalized to the peak energy over an utterance interval. LPC and normalized energy feature signal sequences are produced for an unknown speech pattern. For each time frame, the correspondence between the LPC features of the speech pattern and each reference is measured as well as the correspondence between the energy (E) features. Including the energy features in the comparison reduces errors when background noise and other non-speech events such as a door slam have spectral features very similar to the spectral features of one of the reference patterns. In comparing the unknown speech features to those of the reference templates, the dynamic time warp distance $DT = D_{LPC} + \alpha D_E$ is used where $\alpha$ is a weighting factor selected to minimize the probability of erroneous recognition. Although the Brown arrangement represents an advance in the art, its performance is highly dependent on the weighting factor used during the time warp, pattern matching procedure. Determining the correct weighting factor in a particular application is difficult because it is based on error probability distributions that vary depending on the characteristics of both the reference patterns and the input speech. In addition, since the Brown arrangement relies on an endpointing procedure, performance is substantially degraded in typical applications where responses are unconstrained.

In view of the foregoing, a need exists in the art for an improved speech recognition arrangement that substantially reduces the likelihood of recognizing background noise or other non-speech events as a reference speech pattern, particularly in applications where endpointing is unacceptable.

SOLUTION

The foregoing need is met and a technical advance is achieved in accordance with the principles of the invention in an exemplary speech recognition arrangement where nonspectral features of the input signal, e.g., energy and voicing parameters, are used to effectively remove non-speech events from consideration but only after a time warping procedure based solely on the input and reference pattern spectral parameters has been completed. The time warping procedure is not unduly complex because there is no need to weight spectral and nonspectral parameters in matching input and reference patterns. For each reference pattern, the time warping procedure defines a scan region of the input signal to be used in evaluating the nonspectral input signal characteristics. Energy and voicing parameters are useful in distinguishing non-speech events since speech patterns typically have few very low-energy frames (other than frames that are part of a gap within a vocabulary item) and more than a minimum number of voiced frames, e.g., frames corresponding to vowel sounds.

The method of the invention is performed in a speech recognizer having stored reference pattern templates each comprising a time frame sequence of acoustic spectral parameters of a prescribed reference pattern. According to the method, an input signal is processed to recognize a speech pattern by generating a time frame sequence of acoustic spectral parameters from the input signal. At least one acoustic nonspectral parameter is also derived from the input signal. Each of the reference pattern templates is time aligned with the input signal based on reference pattern and input signal spectral parameters but independent of the nonspectral parameter. A set of similarity measures is determined each representative of the similarity between spectral parameters of the input signal and spectral parameters of one of the time aligned reference pattern templates. The speech pattern is selectively identified in the input signal as one of the reference patterns based both on the similarity measures and on the nonspectral parameter.

In an illustrative speech recognizer described herein, a time frame sequence of acoustic nonspectral parameters comprising energy parameters and voicing parameters is generated from the input signal. For each reference pattern, time frames of the reference pattern template are paired with time frames of the input signal to maximize the similarity measure determined for the reference pattern. The pairing defines a scan region of input signal time frames for the reference pattern. The similarity measure is adjusted based on the number of input signal time frames of the scan region that have an energy parameter less than a predetermined threshold and that are not part of a gap within a vocabulary item and based on the number of input signal time frames of the scan region that have a voicing parameter defining the frame as voiced.

DRAWING DESCRIPTION

DETAILED DESCRIPTION

Figure 1:
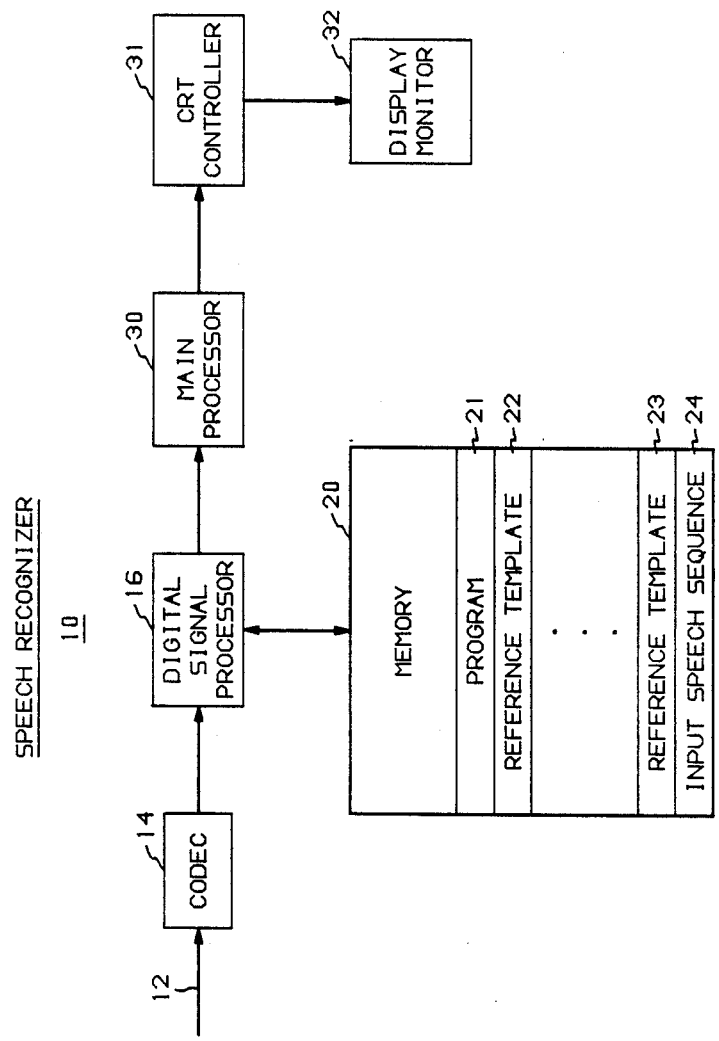
FIG. 1 is a block diagram of an exemplary speech recognizer in accordance with the invention.

In the exemplary speech recognizer 10 of FIG. 1, analog speech is received on line 12 and digitized by a codec 14. The resulting digitized speech is processed by a digital signal processor 16, e.g., an AT&T DSP32. The speech is divided into 45 millisecond frames with a ⅔ overlap and a number of spectral and nonspectral parameters are determined for each frame and stored in block 24 of memory 20. In the present example, the spectral parameters are cepstral coefficients and the nonspectral parameters are voicing and energy parameters. Memory 20 also includes a number of blocks, 22, 23, for storing spectral parameters of a plurality of reference patterns. Only a short past history of the input sequence is stored in block 24, e.g., a sequence twice as long as the longest reference sequence. Recognizer 10 operates to recognize any one of a set of vocabulary items receivable on line 12 without the need to define endpoints of a given utterance. Each vocabulary item may have one or more reference patterns stored in memory 20 corresponding, for example, to different pronunciations of a vocabulary item. Digital signal processor 16 operates under the control of a program 21 to perform speech recognition, including a procedure referred to as time warping used in comparing the input speech with each reference pattern. Significantly, the time warping procedure is only based on the spectral parameters of the input speech and reference patterns and is independent of the nonspectral parameters of the input speech. The distance measures obtained as a result of the time warping procedure are then adjusted based on the nonspectral parameters of the input speech over a sequence of input speech frames referred to as a scan region. The distance adjustment adds penalties to the distance based on the number of low energy and nonvoiced frames. When digital signal processor 16 identifies one of the reference patterns as sufficiently similar to the input speech (based on the adjusted distances), processor 30 is informed of the identified reference pattern. Processor 30 then transmits signals corresponding to the vocabulary item associated with the identified reference pattern to a CRT controller 31. In response, controller 31 transmits the appropriate signals to a display monitor 32 such that the vocabulary item is displayed. In the present embodiment, speech recognizer 10 is implemented on an AT&T 6300 personal computer and codec 14, digital signal processor 16 and memory 20 are included on one slot circuit board.

Figure 3:
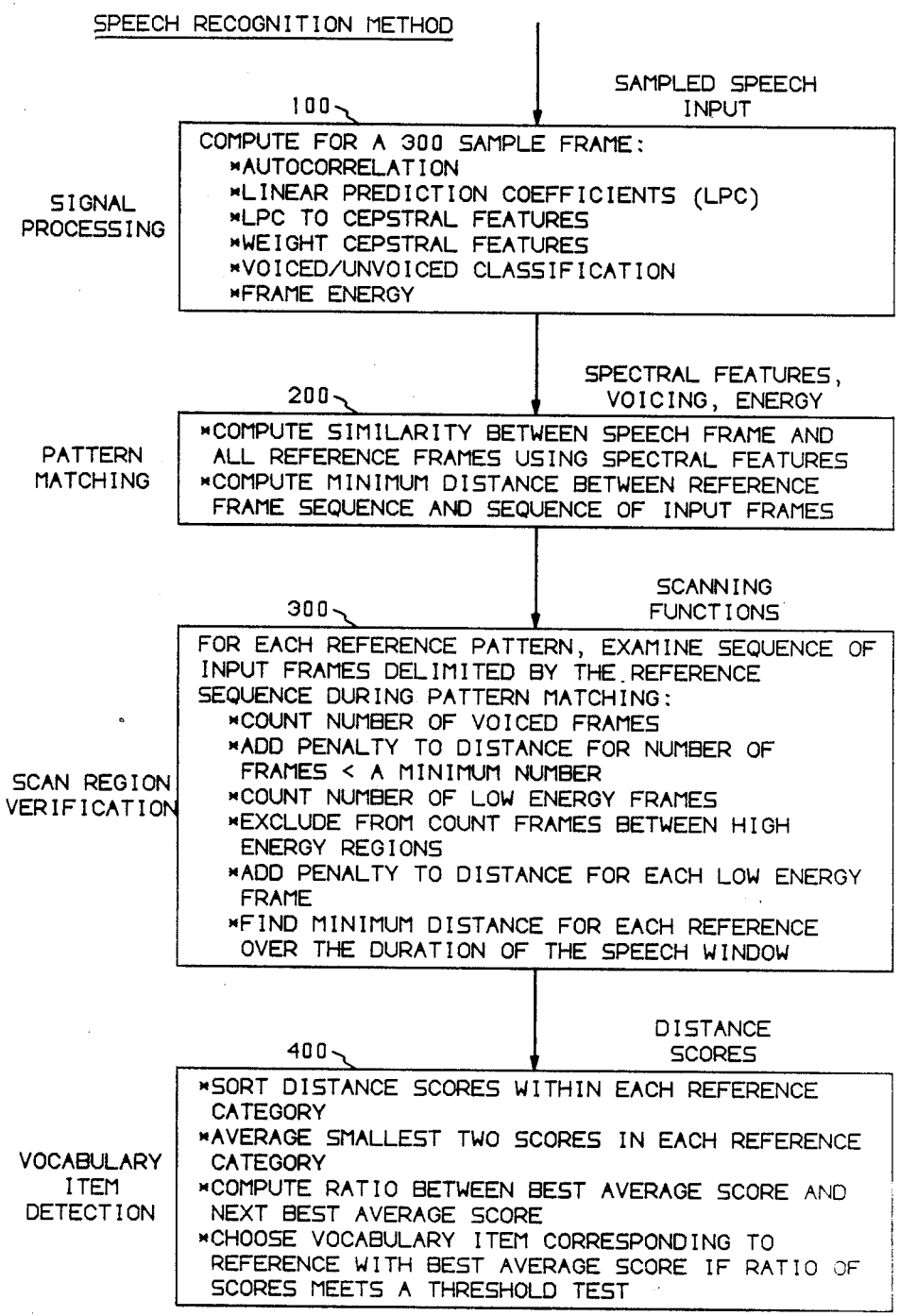
FIG. 3 is a high-level, flow chart of an exemplary recognition method used by the speech recognizer of FIG. 1.

FIG. 3 is an overall flow chart of the exemplary speech recognition method comprising a signal processing section 100, a pattern matching section 200, a scan region verification section 300 and a vocabulary item detection section 400. Signal processing section 100 reduces the incoming speech to a sequence of spectral and nonspectral feature parameters. Unlike isolated word recognition methods, this method does not attempt to mark boundaries of a spoken item. The spectral parameters are used in the pattern matching section 200 where they are compared with reference patterns of these features representing items in the vocabulary to be recognized. The comparison produces a scanning function which indicates regions of similarity between a reference and a portion of the input. The region defined by the scanning function is examined in the scan region verification section 300. If certain speech characteristics are not present in the scan region, the current value of the scanning function is effectively removed from consideration in the vocabulary item detection section 400. Vocabulary item detection differs from isolated word methods in that the past histories of the scanning functions are examined for indications of similarity with a reference, whereas, in an isolated word method, similarity with a reference is only considered for input isolated by the endpoint process.

SIGNAL PROCESSING

Figure 4:
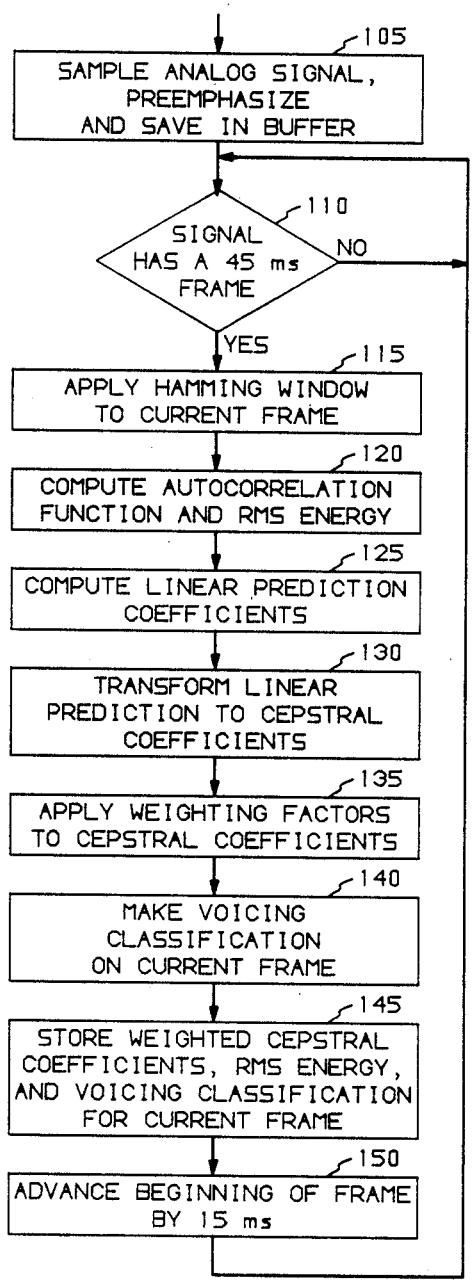
FIGS. 4 through 8 are more detailed flow charts for the method of FIG. 3.

The signal processing flow chart is shown in FIG. 4. The incoming signal is a 16 bit signed integer representation of the analog signal on the telephone line, sampled 6667 times per second (FIG. 4, block 105). Spectral features, energy and voicing are computed as described in Rabiner, L. R. and Levinson, S. E., "Isolated and Connected Word Recognition: Theory and Selected Applications", IEEE TRANS COMMUN, 29(5): 621–659 (May 1981) and Prezas, D. P., Picone, J. and Thomson, D. L., "Fast and Accurate Pitch Detection Using Pattern Recognition and Adaptive Time-Domain Analysis", ICASSP 86, Tokyo. The sampled signal, $\tilde{s}(n)$, is pre-emphasized (block 105) using a first order digital filter producing s(n), where $$\bar{s}(n) = \tilde{s}(n) - 0.95\, \tilde{s}(n-1).$$

The pre-emphasized signal $\bar{s}(n)$ is blocked into segments 45 msec long (300 samples) to compute a set of features representing the signal in this segment (called a frame). A frame of data is defined as $$x(n) = \bar{s}(\text{frame\_start} + n) \text{ for } n = 0, 1, \ldots, 299$$

where frame_start is the beginning of the current frame (block 110).

A smoothing window, w(n), is applied to the signal segment prior to computing the features, giving a windowed signal $$\tilde{x}(n) = x(n) \cdot w(n)$$

where $$w(n) = 0.54 - 0.46 \cos\left(\frac{2\pi n}{N-1}\right)$$

is a Hamming window (block 115). An eighth order autocorrelation function is computed (block 120) from these windowed samples according to the following formula $$r(m) = \sum_{x=0}^{299-m} \tilde{x}(n)\tilde{x}(n+m), \; m = 0, 1, \ldots, 8$$

A set of linear prediction coefficients, which produce a minimum mean squared error all-pole fit to the spectrum of a frame of data, are computed (block 125) by solving a set of simultaneous linear equations involving the autocorrelation function as described in Markel, J. D. and Gray, A. H., Jr., Linear Prediction of Speech, Springer-Verlag, 1976. These linear prediction coefficients are transformed (block 130) into 12 cepstral coefficients using a well known transformation described in the Markel et al. reference. The cepstral coefficients are weighted with weights of the form $$a(k) = 1 + 6 \cdot \sin\left(\frac{\pi k}{12}\right) \text{ for } k = 1, 2, \ldots, 12.$$

The energy feature is determined (block 120) for a signal frame as $$(r(0)/300)^{\frac{1}{2}},$$

the root mean square (rms) energy for that frame. Each frame is also classified (block 140) as predominantly voiced or unvoiced.

The 12 weighted cepstral parameters, rms energy and voicing classification are computed every 15 msec (frames overlap by ⅔). The cepstral parameters, which represent the signal spectrum, form an input frame sequence which is stored (block 145) and scanned by reference patterns for words in the recognizer vocabulary. The beginning of the frame is advanced (block 150) and the signal processing steps repeated for the next frame. The rms energy and voicing classification are used as described later herein to verify that regions having spectral similarity with a reference pattern are likely to contain a vocabulary item.

PATTERN MATCHING

The recognition method uses a simple distance measure defined in the following equation to compute similarity between a frame, m, of a reference pattern and a frame, n, of incoming signal $$d_{n,m}(C_T, C_R) = \sum_{i=1}^{12} (C_{Ti} - C_{Ri})^2$$

where $C_{Ti}$ is the ith coefficient of the input frame and $C_{Ri}$ is the ith coefficient of the reference frame.

The similarity between a sequence of incoming frames and the sequence of frames making up a reference pattern for a vocabulary item is measured by the minimum distance accumulated over a path, w, that aligns input frames with reference frames. This minimum accumulated distance is defined as $$D_{min} = \min \text{ over } w \sum_{n=0}^{N} d_{n,m}(C_T, C_R)/N$$

where N is the number of frames in the path which terminates at the end of the reference pattern and $d_{n,m}(C_T,C_R)$ is defined above, w is the path that aligns the reference sequence with the input sequence resulting in the minimum accumulated distance. (Note that the distance measure is inversely related to a similarity measure between the input signal and the reference pattern. Minimizing the distance measure corresponds to maximizing the similarity measure).

The accumulated distance is calculated recursively at an intermediate frame pair as the sum of the local distance, $d_{n,m}(C_T,C_R)$, and the accumulated distance, $d_{path}$, from previous frames that lie along the path.

$$D_A(n,m) = d_{n,m}(C_T,C_R) + d_{path}$$

where $$d_{path} = \min [D_A(n-1,m), D_A(n-1,m-1), D_A(n-1,m-2)]$$

if the path to (n−1,m) did not come from (n−2,m). If the path to (n−1,m) did come from (n−2,m), $d_{path}$ is given by $$d_{path} = \min [D_A(n-1,m-1), D_A(n-1,m-2)].$$

If $$d_{path} = D_A(n-1,m-2)$$

then $d_{path}$ is modified according to $$d_{path} = d_{path} + d_{n,m}(C_T,C_R).$$

These restrictions on the path require that a reference frame not contribute to the accumulated distance for more than two consecutive input frames and that if the path is allowed to skip a reference frame, a penalty equal to the local distance is added to the accumulated distance to compensate for the missing reference frame.

Figure 2:
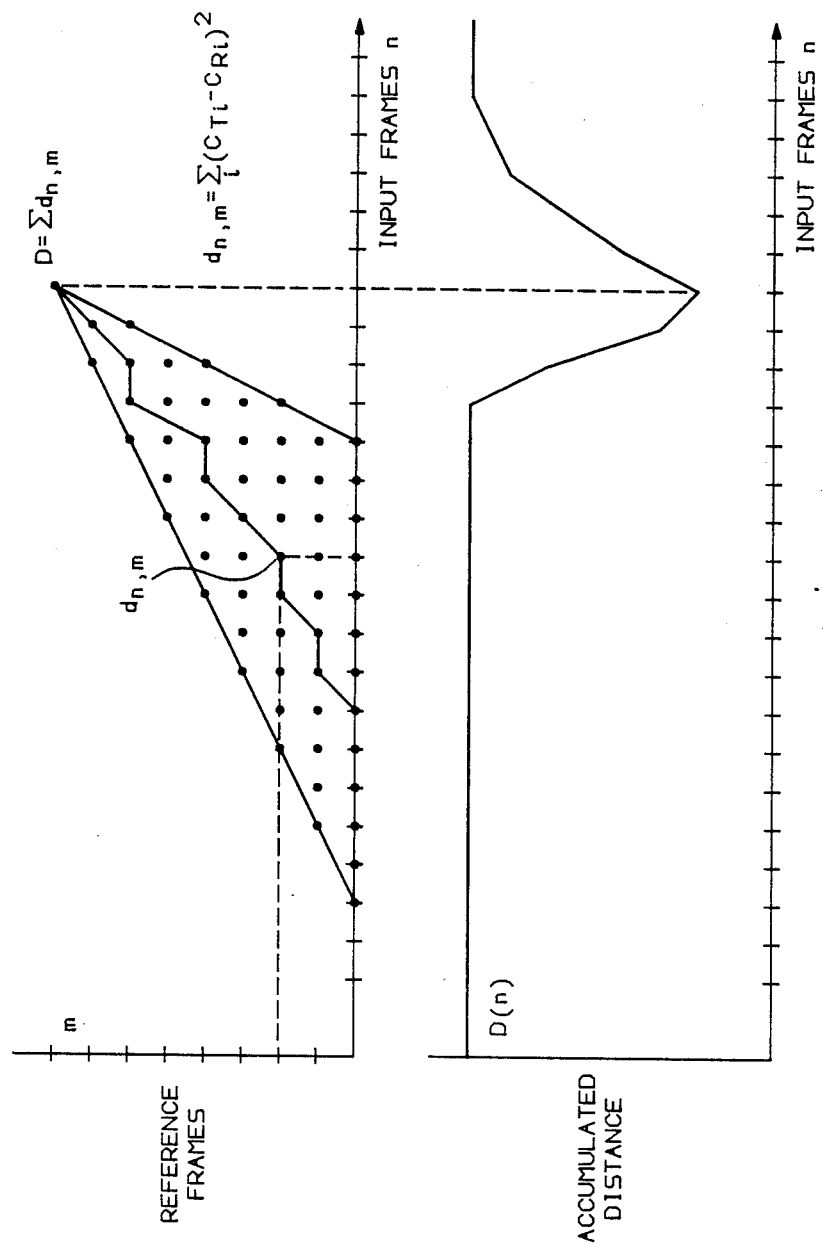
FIG. 2 is a diagram illustrating the time warping procedure used in the speech recognizer of FIG. 1.

These local constraints on the path allow the reference to be compressed or expanded by a factor of 2:1 to align with the input sequence of frames. The matching procedure leading to a scanning function is illustrated in FIG. 2. The upper half of FIG. 2 represents the calculation of the accumulated distance between a reference sequence and a portion of the input sequence. The $D_{min}$ defined above is the sum of the $d_{n,m}$ (indicated by dots) over the path leading to the smallest D within the range of possible paths determined by the local constraints (outlined region). The minimum accumulated distance D, determined at the end of a reference sequence, is calculated to each frame of the input, therefore, the procedure indicated in the upper half of FIG. 2 is repeated for each reference at each input frame. A sequence of values for D is indicated in the lower half of FIG. 2. The D calculated at a particular input frame in the upper half of FIG. 2 is identified in the lower half of FIG. 2 by the dotted line. D(n) is the record of similarity between a reference sequence and the input sequence. The D(n) in this figure has been limited to a maximum value. The minimum of this function may lead to detection of a vocabulary item in the input signal subject to the verification procedure over the scan region of input frames determined by the path.

The pattern matching compares the test pattern to stored reference patterns of previously parameterized utterance, and the most likely candidate for the speech segment is determined. But rarely are the time scales of a reference and test pattern exactly the same; not only do the absolute lengths differ, but there are local variations within each utterance as well—the articulation of sounds varies within and across speakers. A method of time warping is required to align each reference pattern with the test pattern. Time warping stretches and compresses each reference pattern locally to best match the speech segment. The two components of such a dynamic time warping (DTW) method are: (1) a distance metric for comparing the feature sets of test and reference patterns and (2) a specification of local path constraints that dictate allowable warping contours. Once a warping path is found, other acoustic features (presently voicing and energy) are evaluated over the speech segment. These features are then used as described herewith to arrive at a single number that reflects the similarity of the test and reference pattern.

Figure 5:
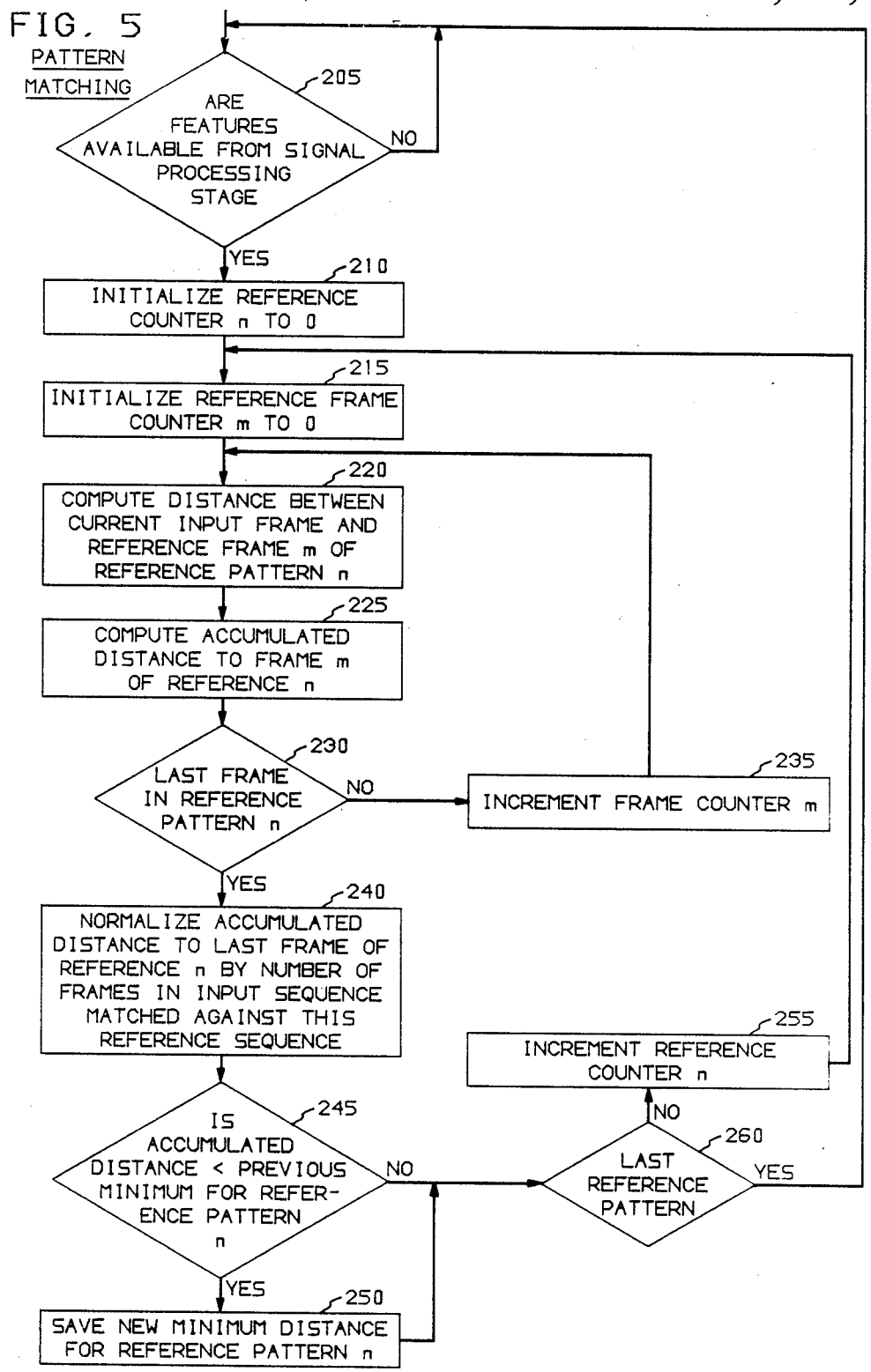

The pattern matching flow chart is shown in FIG. 5. The spectral and nonspectral parameters are obtained in block 205 from the signal processing of FIG. 4. In blocks 210 and 215, a reference counter and a frame counter are initialized to zero. For the first reference, the sequence of blocks 220, 225, 230, and 235 is performed once for each of the frames of the first reference to determine the accumulated distance to each such frame. Then in block 240 the accumulated distance to the last frame of the first reference is normalized by the number of frames of the input sequence that were matched against the first reference sequence. If it is determined in block 245 that the accumulated distance is less than the previous minimum for the first reference pattern, the new minimum is stored in block 250. Since it is determined in block 255 that this is not the last reference, the reference counter is incremented in block 260 and the entire sequence of blocks is repeated for each of the remaining reference patterns.

SCAN REGION VERIFICATION

To determine whether the current value of the scanning function covers a region of input likely to contain a vocabulary item, the sequence of input frames that aligned with the reference sequence is examined for characteristics of speech that differentiate the input from background noise and nonspeech events. For a vocabulary item to be present within the scan region, a minimum number of frames having characteristics of voiced sounds must be included in the scan region. Voiced sounds have very distinctive signal characteristics which are readily detected using a method that has been designed for telephone bandwidth speech. A penalty distance is added to the accumulated distance of the scanning function for each frame less than the minimum. A penalty distance is also added to the scanning function for each frame in the scan region that contains very low energy that is not part of a gap within a word or a gap between words (there may be multiple word vocabulary items).

A scan region is that portion of the sequence of inputs frames that aligned itself with a reference pattern as described in the last section. This frame sequence is examined for voicing and energy level that differentiate the input form background noise and non-speech events.

A penalty distance is accumulated for every voiced frame less than a minimum number found in the scan region. This minimum can be chosen conservatively to cover all vocabulary items or can be variable dependent on the expected number of voiced frames in each vocabulary item. The voicing penalty is defined as $$\text{voicing\_penalty} = \text{min\_voicing} - \left[ \sum_{\text{scan region}} \text{voiced frames} \right]$$

where min_voicing is the minimum number of voiced frames required before imposing a penalty and voicing_penalty has a minimum value of 0.

A penalty distance is also accumulated for each frame in the scan region that contains very low energy that is not part of a gap within a word (or between words in multiple word vocabulary items). The energy penalty is defined as $$\sum_{\text{scan region}} [\text{if (frame energy} < \text{energy threshold) energy\_penalty} = \text{energy\_penalty} + 1]$$

The adjusted accumulated distance between reference and input sequence is $D = D_{min} + \alpha \cdot \text{voicing\_penalty} + \beta \cdot \text{energy\_penalty}$ where $\alpha$ = weighting factor for voicing penalty $\beta$ = weighting factor for energy penalty The adjusted accumulated distance, D, is calculated once per unit frame for each reference pattern. The minimum distance for each reference is saved over the duration of the input sequence. These distances are sorted and sent to the detection subroutine for a decision.

Figure 6:
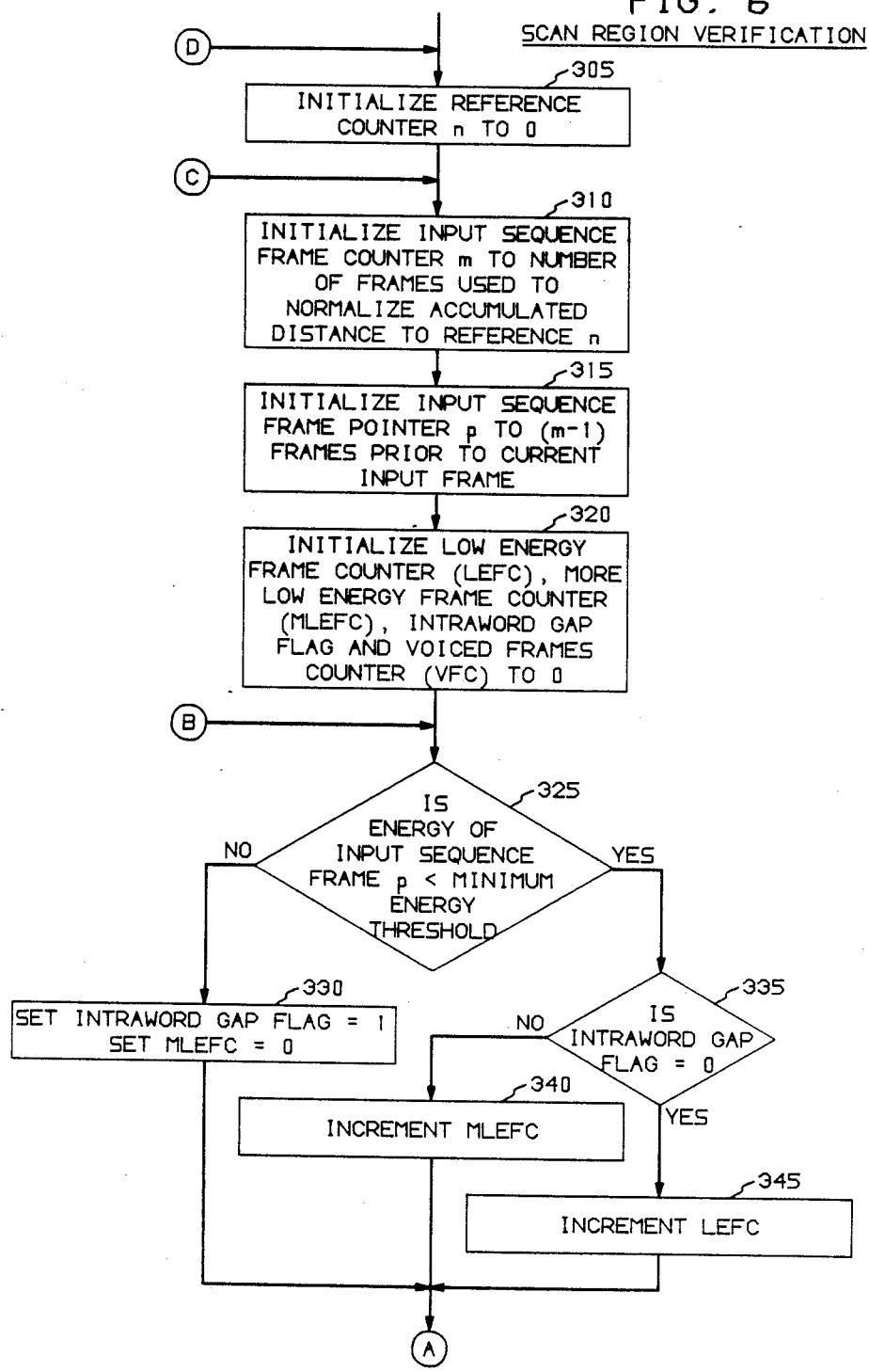
Figure 7:
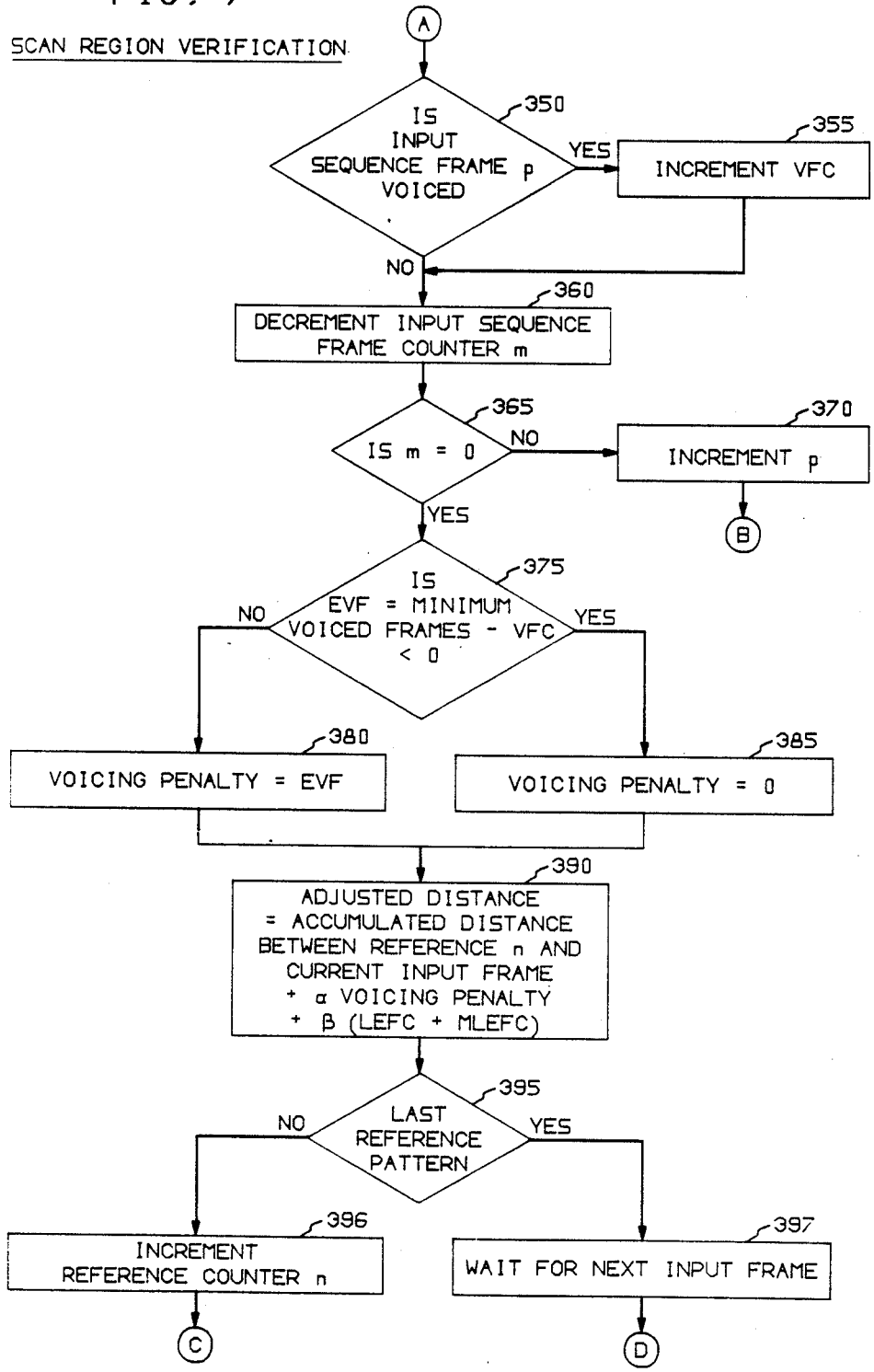

The scan region verification flow chart is shown in FIGS. 6 and 7. Recall that the scan region for a given reference is the sequence of input frames that were matched with frames of that reference. In block 305, the reference counter is initialized to zero. For the first reference, the input sequence frame counter m is initialized in block 310 to the number of frames used for normalization of the accumulated distance for the first reference. In block 315, the input sequence frame pointer p is initialized to (m−1) frames prior to the current input frame. A low energy frame counter (LEFC), a more low energy frame counter (MLEFC), an intraword gap flag and a voiced frames counter (VCF) are all initialized to zero. The intraword gap flag is used to distinguish between low energy frames at the beginning or end of vocabulary items and such frames within single-word and multiple-word vocabulary items. In block 325, a threshold energy determination is made. If the energy of input sequence frame p is not less than the minimum energy threshold, the intraword gap flap is set to one and MLEFC to zero in block 330. If the energy of input sequence frame p is less than the minimum energy threshold, either MLEFC or LEFC is incremented in block 340 or 345 depending on the value of the intraword gap flag as determined in block 335. Accordingly, low energy frames that are part of a gap within a vocabulary item are not included by either of the counters LEFC or MLEFC. A voicing determination is made in block 350 and VFC is incremented in block 355 if the frame is voiced. The input sequence counter m is decremented in block 360. If m is determined to be nonzero in block 365, p is incremented in block 370 and the sequence of blocks between 325 and 365 is repeated for each of the frames of the scan region. When m is determined to be equal to zero in block 365, the appropriate voicing penalty, if any, is determined in blocks 375, 380, and 385. The adjusted distance between the input sequence and the first reference pattern is then calculated in block 390 taking into account weighted voicing and energy penalties. Since it is determined in block 395 that this is not the last reference, the reference counter is incremented in block 396 and the entire sequence of blocks is repeated for each of the remaining reference patterns. Processing then waits in block 397 for the next input frame.

VOCABULARY ITEM DETECTION

Figure 8:
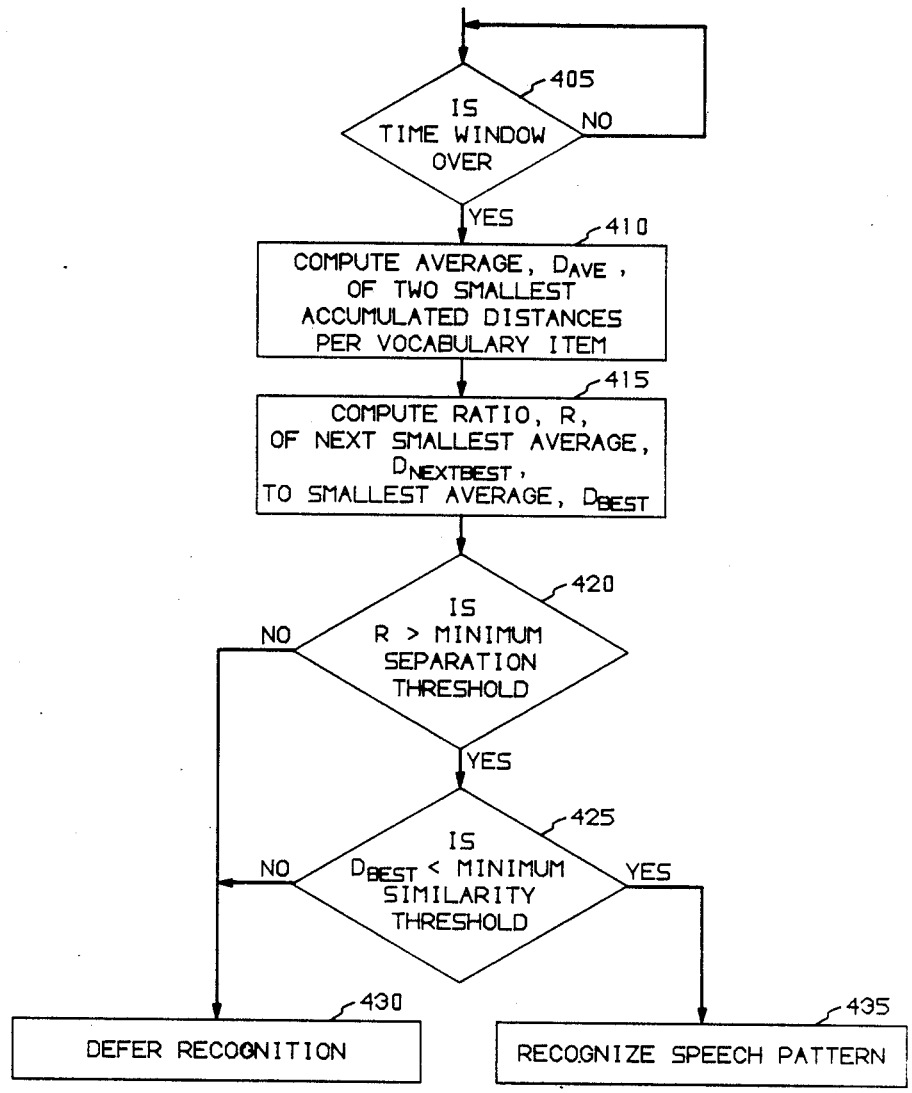

In the present exemplary embodiment, it is assumed that a vocabulary item was spoken with a finite length window of time. This assumption is appropriate for applications where a customer is prompted for input. A vocabulary item is detected by identifying the minimum of all scanning functions over the duration of the window. The detection processing flow chart is shown in FIG. 8. When the time window is over (block 405, FIG. 8), the decision rule selects the vocabulary item having the smallest distance between input and reference as measured (block 410) by the average of the smallest two distances for each vocabulary item i.

$$D_{ave} = \min \text{ over } i \left[ \frac{D_{i\ smallest} + D_{i\ nextsmallest}}{2} \right]$$

This rule forces a recognition decision for all words in the test data set. If the distance for the next best choice of vocabulary item is required (block 420) to be a fixed percentage larger than the distance for the best choice for a decision to be rendered, $$R = \frac{D_{nextbest}}{D_{best}} > \text{minimum separation threshold}$$

the number of recognition errors will be reduced at the expense of the number of inputs on which no decision is made. The tradeoff between the number of rejected utterances and the number of recognition errors is strongly dependent on the cost of making an error in a particular application. In most network applications, customers whose utterances are rejected may be given another chance to provide input or can be routed immediately to a live operator for assistance. A minimal similarity (expressed as a maximum distance between input and reference) to a vocabulary item $$D_{best} < \text{minimum similarity threshold}$$

is also required (block 425) before a decision is made. Requiring a reasonable separation in distances for vocabulary items and placing a ceiling on the maximum distance allowed, reduces the probability of accepting an utterance which is outside the vocabulary.

The method could be modified to identify all local minima in the scanning function as potential occurrences of a vocabulary item with no limit on the length of time considered for valid input. This form of the method is often referred to as "word spotting" and has application when processing unlimited input for "key" words.

It is to be understood that the above-described embodiment is merely illustrative of the principles of the present invention and that many variations may be devised by those skilled in the art without departing from the spirit and scope of the invention. It is therefore intended that such variations be included within the scope of the claims.

I claim:

1. In a speech recognizer having a plurality of stored reference pattern templates each comprising a time frame sequence of acoustic spectral parameters of a prescribed reference pattern, a method for processing an input signal to recognize a speech pattern comprising
generating a time frame sequence of acoustic spectral parameters from said input signal,
generating a time frame sequence of acoustic nonspectral parameters from said input signal,
time aligning each of said reference pattern templates with said input signal based on reference pattern and input signal spectral parameters but independent of said nonspectral parameters,
determining a set of similarity measures each representative of the similarity between spectral parameters of said input signal and spectral parameters of one of the time aligned reference pattern templates and
selectively identifying said speech pattern in said input signal as one of said reference patterns based both on said similarity measures and on said nonspectral parameters,
wherein said time aligning comprises
for each of said reference patterns, pairing time frames of that reference pattern template with time frames of said input signal to maximize the similarity measure determined for that reference pattern, said pairing defining a scan region of input signal time frames for that reference pattern,
wherein said selectively identifying comprises
for each of said reference patterns, adjusting the determined similarity measured based on said nonspectral parameters over the scan region of input signal time frames for that reference pattern and
selectively identifying said speech pattern in said input signal as one of said reference patterns based on said adjusted similarity measures.

2. A method in accordance with claim 1 wherein said sequence of acoustic nonspectral parameters comprises energy parameters and wherein said adjusting comprises
for each of said reference patterns, adjusting the determined similarity measure based on the number of input signal time frames of the scan region for that reference pattern that have an energy parameter less than a predetermined threshold.

3. A method in accordance with claim 1 wherein said sequence of acoustic nonspectral parameters comprises energy parameters and wherein said adjusting comprises
for each of said reference patterns, adjusting the determined similarity measure based on the number of input signal time frames of the scan region for that reference pattern that have an energy parameter less than a predetermined threshold and that are not part of a gap within a vocabulary item.

4. A method in accordance with claim 1 wherein said sequence of acoustic nonspectral parameters comprises voicing parameters and wherein said adjusting comprises
for each of said reference patterns, adjusting the determined similarity measured based on the number of input signal time frames of the scan region for that reference pattern that have a voicing parameter defining the frame as voiced.

5. A method in accordance with claim 1 wherein said sequence of acoustic nonspectral parameters comprises energy parameters and voicing parameters and wherein said adjusting comprises
for each of said reference patterns, adjusting the determined similarity measure based on the number of input signal time frames of the scan region for that reference pattern that have an energy parameter less than a predetermined threshold and that are not part of a gap within a vocabulary item and based on the number of input signal time frames of the scan region for that reference pattern that have a voicing parameter defining the frame as voiced.

6. A method in accordance with claim 1 wherein said sequence of acoustic nonspectral parameters comprises voicing parameters and wherein said adjusting comprises
for each of said reference patterns, adjusting the determined similarity measure based on the difference between a minimum number and the number of input signal time frames of the scan region for that reference pattern that have a voicing parameter defining the frame as voiced.

7. A method in accordance with claim 6 wherein said minimum number is constant for all of said reference patterns.

8. A method in accordance with claim 6 wherein said minimum number is a variable dependent on an expected number of voiced frames for a reference pattern.

9. In a speech recognizer having a plurality of stored reference pattern templates each comprising a time frame sequence of acoustic spectral parameters of a prescribed reference pattern, a method for processing an input signal to recognize a speech pattern comprising
generating a time frame sequence of acoustic spectral parameters from said input signal,
generating a time frame sequence of voicing parameters from said input signal, each of said voicing parameters defining the presence or absence of a vowel sound
determining a set of similarity measures each representative of the similarity between spectral parameters of said input signal and spectral parameters of one of the reference pattern templates and
selectively identifying said speech pattern in said input signal as one of said reference patterns based both on said similarity measures and on said voicing parameters.

10. A speech recognizer for processing an input signal to recognize a speech pattern comprising
memory means for storing a plurality of reference pattern templates each comprising a time frame sequence of acoustic spectral parameters of a prescribed reference pattern and
digital signal processor means comprising
means responsive to said input signal for generating a time frame sequence of acoustic spectral parameters,
means responsive to said input signal for generating a time frame sequence of acoustic nonspectral parameters,
means for time aligning each of said reference pattern templates with said input signal based on reference pattern and input signal spectral parameters but independent of said nonspectral parameters,
means for determining a set of similarity measures each representative of the similarity between spectral parameters of said input signal and spectral parameters of one of the time aligned reference pattern templates and
means for selectively identifying said speech pattern in said input signal as one of said reference patterns based both on said similarity measures and on said nonspectral parameters,
wherein said time aligning means comprises
means for pairing, for each of said reference patterns, time frames of that reference pattern template with time frames of said input signal to maximize the similarity measure determined by said determining means for that reference pattern, said pairing defining a scan region of input signal time frames for that reference pattern,
wherein said selectively identifying means comprises
means for adjusting, for each of said reference patterns, the determined similarity measure based on said at least one nonspectral parameter and
means for selectively identifying said speech pattern in said input signal as one of said reference patterns based on said adjusted similarity measures.

11. A speech recognizer for processing an input signal to recognize a speech pattern comprising
memory means for storing a plurality of reference pattern templates each comprising a time frame sequence of acoustic spectral parameters of a prescribed reference pattern and
digital signal processor means comprising means responsive to said input signal for generating a time frame sequence of acoustic spectral parameters, means responsive to said input signal for generating a time frame sequence of voicing parameters, each of said voicing parameters defining the presence or absence of a vowel sound, means for determining a set of similarity measures each representative of the similarity between spectral parameters of said input signal and spectral parameters of one of the reference pattern templates and means for selectively identifying said speech pattern in said input signal as one of said reference patterns based both on said similarity measures and on said voicing parameters.

* * * * *